United States Patent
Cao et al.

(10) Patent No.: US 12,420,367 B2
(45) Date of Patent: Sep. 23, 2025

(54) ROLL REPLACING DEVICE AND TAB WELDING APPARATUS

(71) Applicant: WUXI LEAD INTELLIGENT EQUIPMENT CO., LTD., Jiangsu (CN)

(72) Inventors: Er Cao, Jiangsu (CN); Xiaofei Yang, Jiangsu (CN)

(73) Assignee: WUXI LEAD INTELLIGENT EQUIPMENT CO., LTD., Jiangsu (CN)

(*) Notice: Subject to any disclaimer, the term of this patent is extended or adjusted under 35 U.S.C. 154(b) by 125 days.

(21) Appl. No.: 17/799,981

(22) PCT Filed: Oct. 14, 2021

(86) PCT No.: PCT/CN2021/123873
§ 371 (c)(1),
(2) Date: Aug. 16, 2022

(87) PCT Pub. No.: WO2022/170778
PCT Pub. Date: Aug. 18, 2022

(65) Prior Publication Data
US 2024/0181581 A1    Jun. 6, 2024

(30) Foreign Application Priority Data
Feb. 9, 2021  (CN) .................. 202110175825.7

(51) Int. Cl.
*B65H 19/30*     (2006.01)
*B23P 23/04*     (2006.01)
(Continued)

(52) U.S. Cl.
CPC ............. *B23P 23/04* (2013.01); *B23Q 3/06* (2013.01); *B23Q 7/00* (2013.01); *H01M 50/536* (2021.01)

(58) Field of Classification Search
CPC ............... B65H 19/30; B65H 19/1826; B65H 19/1852; B65H 2402/32;
(Continued)

(56) References Cited

U.S. PATENT DOCUMENTS

| | | | |
|---|---|---|---|
| 4,949,910 A | 8/1990 | Kleitz | |
| 8,628,038 B2* | 1/2014 | Muller | B65H 19/1852 242/554.2 |

(Continued)

FOREIGN PATENT DOCUMENTS

| | | |
|---|---|---|
| CN | 106006128 A | 10/2016 |
| CN | 106115328 A | 11/2016 |

(Continued)

OTHER PUBLICATIONS

International Search Report and the Written Opinion Dated Jan. 5, 2022 From the International Searching Authority Re. Application No. PCT/CN2021/123873.

(Continued)

*Primary Examiner* — Sang K Kim
(74) *Attorney, Agent, or Firm* — Rivka Friedman (57) ABSTRACT

The present application relates to a roll replacing device and a tab welding apparatus. The roll replacing device includes an unwinding mechanism, a first fixing mechanism, a second fixing mechanism, a cutting mechanism, and a strip connection mechanism; wherein the first fixing mechanism is capable of following a sliding bracket to move along a first direction until a spare material strip fixed by the first fixing mechanism and a working material strip fixed by the second fixing mechanism are aligned at a strip connection station, and allows the strip connection mechanism to connect the working material strip and the spare material strip which are aligned at the strip connection station.

20 Claims, 5 Drawing Sheets

(51) Int. Cl.
  *B23Q 3/06* (2006.01)
  *B23Q 7/00* (2006.01)
  *H01M 50/536* (2021.01)

(58) Field of Classification Search
  CPC ..... B65H 2301/46222; B65H 2801/72; H01M 50/536
  See application file for complete search history.

(56) References Cited

U.S. PATENT DOCUMENTS

| | | | |
|---|---|---|---|
| 10,392,215 B2 * | 8/2019 | Mark | B65H 19/18 |
| 11,753,264 B2 * | 9/2023 | Cao | B65H 19/1852 242/532.3 |
| 11,975,493 B2 * | 5/2024 | Yang | B29C 65/5092 |
| 2024/0076156 A1 * | 3/2024 | Yang | B65H 19/20 |
| 2024/0076157 A1 * | 3/2024 | Cao | B65H 19/1852 |

FOREIGN PATENT DOCUMENTS

| | | |
|---|---|---|
| CN | 108598547 A | 9/2018 |
| CN | 108701869 A | 10/2018 |
| CN | 109075313 A | 12/2018 |
| CN | 110415309 A | 11/2019 |
| CN | 110451309 A | 11/2019 |
| CN | 112186272 A | 1/2021 |
| CN | 112828603 A | 5/2021 |
| CN | 214444509 U | 10/2021 |
| EP | 0598265 A1 | 5/1994 |
| EP | 3087020 B1 | 3/2019 |
| KR | 100915269 B1 | 9/2009 |

OTHER PUBLICATIONS

Intention to grant in European application No. 21925097.4, mailed on Nov. 13, 2024.
Chinese Office Action issued in corresponding Chinese Patent Application No. 202110175825.7 dated Aug. 29, 2024.
Extended European Search Report in European application No. 21925097.4, mailed on Mar. 25, 2024.

* cited by examiner

ROLL REPLACING DEVICE AND TAB WELDING APPARATUS

CROSS-REFERENCE TO RELATED APPLICATION

This application claims priority to Chinese Application No. 202110175825.7, filed on Feb. 9, 2021, and titled "ROLL REPLACING DEVICE AND TAB WELDING APPARATUS", which is incorporated herein by reference in its entirety.

TECHNICAL FIELD

The present application relates to a technical field of battery manufacturing equipment, and in particular, to a roll replacing device and a tab welding apparatus.

BACKGROUND OF DISCLOSURE

In a manufacturing process of lithium batteries, it is necessary to wind a cathode plate, a separator, and an anode plate to form a battery cell. Before the plates enter a winding device for winding, tabs need to be welded at specific positions of the plates, and then the tabs are wound together with the plates.

Generally, the tabs are provided by a method of unwinding a material roll, so when a tab material roll is used up, it needs to be replaced with a new tab material roll. At present, in actual production, replacement of the tab material roll is done manually, which leads to long downtime, reduces productivity, and increases labor cost.

BRIEF SUMMARY OF DISCLOSURE

Based on this, it is necessary to provide a roll replacing device and a tab welding apparatus that improve abovementioned defects of a problem of long downtime and increased labor cost due to manual replacement of rolls in the prior art in order to replace tab material rolls.

A roll replacing device, comprising:
an unwinding mechanism comprising a sliding bracket and an unwinding assembly mounted on the sliding bracket; the sliding bracket is configured to controllably move along a first direction, and the unwinding assembly is used for outputting a working material strip and a spare material strip;
a first fixing mechanism provided on the sliding bracket, and located downstream of the unwinding assembly, capable of controllably fixing the working material strip and the spare material strip output from the unwinding assembly;
a second fixing mechanism arranged downstream of the first fixing mechanism to form a strip connection station between the first fixing mechanism and the second fixing mechanism, the second fixing mechanism capable of controllably fixing the working material strip and the spare material strip passing through the first fixing mechanism; wherein the working material strip and the spare material strip located between the first fixing mechanism and the second fixing mechanism are arranged at intervals along the first direction;
a cutting mechanism used for cutting off the working material strip and the spare material strip at the strip connection station; and
a strip connection mechanism arranged corresponding to the strip connection station;
wherein, the first fixing mechanism is capable of following the sliding bracket to move along the first direction until the spare material strip fixed by the first fixing mechanism and the working material strip fixed by the second fixing mechanism are aligned at the strip connection station, and allows the strip connection mechanism to connect the working material strip and the spare material strip which are aligned at the strip connection station.

In one embodiment, the first fixing mechanism and the second fixing mechanism are respectively located on both sides of the strip connection station in a third direction perpendicular to the first direction, and the cutting mechanism and the strip connection mechanism are respectively located on both sides of the strip connection station in a second direction, and the second direction are perpendicular to the first direction and the third direction.

In one embodiment, the cutting mechanism includes an adjusting assembly and two cutting assemblies mated and connected to the adjusting assembly, and each of the cutting assemblies has a first cutter and a second cutter cooperated to the first cutter for cutting;
the adjusting assembly is provided on the sliding bracket and is capable of controllably driving the two cutting assemblies to move away from each other in the first direction to respective cutting positions for cutting off the working material strip or the spare material strip; and
when the two cutting assemblies move to the respective cutting positions, the working material strip and the spare material strip at the strip connection station respectively enter between the first cutter and the second cutter of corresponding cutting assemblies, respectively.

In one embodiment, the cutting mechanism further includes a moving assembly, the moving assembly is provided on the sliding bracket and is connected with the adjusting assembly by transmission, to controllably drive the adjusting assembly to move along a fourth direction at an angle to the first direction until both the cutting assemblies are located between the working material strip and the spare material strip at the strip connection station.

In one embodiment, the moving assembly includes a moving driving member mounted to the sliding bracket and a moving plate drivingly connected with the moving driving member. The adjusting assembly is mounted to the moving plate, and the moving driving member is used to drive the moving plate to move along the fourth direction.

In one embodiment, each of the cutting assemblies further includes a mounting base movably connected to the moving plate along the first direction, and the first cutter and the second cutter are mounted to the mounting base.

The mounting bases of the two cutting assemblies are both drivingly connected with the adjusting assembly, so as to be driven by the adjusting assembly to approach or away from each other along the first direction.

In one embodiment, the unwinding mechanism further comprises a base and a switching driving member; the sliding bracket is movably connected to the base along the first direction, the switching driving member is mounted on the base and is connected to the sliding bracket by transmission, so as to drive the sliding bracket to move along the first direction relative to the base.

In one embodiment, the first fixing mechanism has a first fixing position and a second fixing position arranged at intervals along the first direction. The first fixing position and the second fixing position are used for fixing the working material strip and the spare material strip.

In one embodiment, the unwinding assembly comprises a first unwinding assembly and a second unwinding assembly, the first unwinding assembly and the second unwinding assembly are provided on both sides of the sliding bracket in the first direction, respectively; the first unwinding assembly is used to unwind and output a material strip that can be used as the working material strip or the spare material strip to the first fixing mechanism; the second unwinding assembly is used to unwind and output a material strip that can be used as the spare material strip or the working material strip to the first fixing mechanism.

In one embodiment, The roll replacing device according to claim 9, wherein the first fixing position is arranged corresponding to the first unwinding assembly, so that the first fixing position is used to tightly clamp or release the material strip unwound and output from the first unwinding assembly; the second fixing position is arranged corresponding to the second unwinding assembly, so that the second fixing position is used to tightly clamp or release the material strip unwound and output from the second unwinding assembly.

In one embodiment, the first fixing mechanism includes a clamping driving member mounted on the sliding bracket and two clamping blocks drivingly connected with the clamping driving member. The first fixing position and the second fixing position are formed between the two clamping blocks, and the clamping driving member is used to drive the two clamping blocks to clamp or release each other.

In one embodiment, the second fixing mechanism includes a first fixing assembly, a second fixing assembly, and a third fixing assembly, and the first fixing assembly and the second fixing assembly are located on both sides of the third fixing assembly in the first direction, respectively; during movement of the sliding bracket along the first direction, the first fixing position and the second fixing position can be alternately aligned with the third fixing assembly;

wherein the second fixing position is aligned with the second fixing assembly when the first fixing position is aligned with the third fixing assembly, so that the second fixing assembly fixedly connects the spare material strip passing through the second fixing position;

when the second fixing position is aligned with the third fixing assembly, the first fixing position is aligned with the first fixing assembly such that the first fixing assembly fixedly connects the spare material strip passing through the first fixing assembly.

In one embodiment, the first fixing assembly comprises a first bracket, a first fixed clamp block, and a first movable clamp block; and the first fixed clamp block is fixedly connected to the first bracket, and the first movable clamp block is provided on the first bracket and is configured to be able to approach or move away from the first fixed clamp block.

In one embodiment, the second fixing assembly comprises a second bracket, a second fixed clamp block, and a second movable clamp block; and the second fixed clamp block is fixedly connected to the second bracket, and the second movable clamp block is provided on the second bracket and is configured to be able to approach or move away from the second fixed clamp block.

In one embodiment, the third fixing assembly comprises a third bracket, a gripping driving member, and two gripping blocks; and the gripping driving member is mounted to the third bracket; and the two gripping blocks are connected to the gripping driving member, so as to be driven by the gripping driving member to tightly clamp or release the working material strip between the two gripping blocks.

In one embodiment, the strip connection mechanism includes a tape sticking assembly comprising a tape sticking driving member and two tape sticking suction cups drivingly connected to the tape sticking driving member, and at least one of the two tape sticking suction cups is used to suck up adhesive tapes. The tape sticking driving member is used to drive the two tape sticking suction cups to be in a closed state to stick the adhesive tapes on the tape sticking suction cups to the working material strip and the spare material strip aligned at the strip connection station.

In one embodiment, the strip connection mechanism further includes a translation driving member and a driving block; the translation driving member is drivingly connected to the driving block, and the tape sticking driving member is mounted to the driving block; and the translation driving member is used to drive the driving block to move between a tape spare position where the tape sticking suction cups suck up the adhesive tapes and a tape sticking position where the tape sticking suction cups stick the adhesive tapes on the working material strip and the spare material strip.

In one embodiment, the strip connection mechanism further includes a tape spare plate arranged on the tape spare position, and at least one side surface of the tape spare plate is used for sticking the adhesive tapes; and when the driving block moves to the tape spare position, the tape sticking driving member drives the two tape sticking suction cups to be in the closed state, so that the tape sticking suction cups suck the tape on the tape spare plate.

In one embodiment, the tape sticking driving member is used to drive the two tape sticking suction cups to rotate in opposite direction to each other to the closed state and a flat state.

A tab welding apparatus comprising the roll replacing device as described in any of the above embodiments.

In the above-mentioned roll replacing device and tab welding apparatus, in actual operations, the working material strip unwound and output from the unwinding assembly passes through the first fixing mechanism, the strip connection station, and the second fixing mechanism successively, and is conveyed downstream. The starting end of the spare material strip unwound and output from the unwinding assembly passes through the first fixing mechanism and the strip connection station successively, and is fixed to the second fixing mechanism.

When the working material strip on the unwinding assembly is used up and needs to be replaced, firstly, the first fixing mechanism fixes the working material strip and the spare material strip unwound and output from the unwinding assembly at a same time, and the second fixing mechanism also fixes the working material strip (at this time, the working material strip is jointly fixed by the first fixing mechanism and the second fixing mechanism, and the spare material strip is also jointly fixed by the first fixing mechanism and the second fixing mechanism). Then, the cutting mechanism cuts off the working material strip and the spare material strip at the strip connection station. Then, the sliding bracket drives the first fixing mechanism to move along the first direction until the cut-off end of the spare material strip fixed to the first fixing mechanism and the cut-off end of the working material strip fixed to the second fixing mechanism are aligned at the strip connection station. Then, the strip connection mechanism connects the cut-off end of the working material strip and the cut-off end of the spare material strip which are aligned at the strip connection station. Finally, the first fixing mechanism releases the fixing of the spare material strip and the second fixing mechanism also releases the fixing of the working material strip, so that the spare material strip unwound and output from the unwinding assembly passes through the first fixing mechanism, the strip connection station, and the second fixing mechanism successively and is conveyed downstream, i.e., the spare material strip unwound and output from the unwinding assembly is converted into the working material strip. In addition, at this time, a used-up material roll on the unwinding assembly can be replaced, and a material strip output from a new material roll can be used as a spare material strip, and a starting end of the spare material strip is pulled out of the first fixing mechanism and the strip connection station successively and fixed to the second fixing mechanism in preparation for next roll replacing.

In this way, the roll replacing device in the present application can realize automatic switching of the working material strip and the spare material strip (i.e., automatic roll replacing), which greatly reduces downtime, improves productivity, and reduces labor cost compared to the manual roll replacing method used in the prior art.

BRIEF DESCRIPTION OF DRAWINGS

In order to more clearly illustrate embodiments of the present application or a technical solution in the prior art, accompanying drawings that need to be used in a description of the embodiments or the prior art will be briefly introduced as follows, obviously, the drawings in the following description are only the embodiments of the present application. For those skilled in the art, other drawings can also be obtained according to the disclosed drawings without creative efforts.

DETAILED DESCRIPTION OF PREFERRED EMBODIMENTS

In order to make the above objects, features and advantages of the present application more clearly understood, the specific embodiments of the present application will be described in detail below with reference to the accompanying drawings. In the following description, numerous specific details are set forth in order to provide a thorough understanding of the present application. However, the present application can be implemented in many other ways different from those described herein, and those skilled in the art can make similar improvements without departing from the connotation of the present application. Therefore, the present application is not limited by the specific embodiments disclosed below.

In the description of this application, it is to be understood that orientation or positional relationship indicated by terms "center", "vertical", "horizontal", "length", "width", "thickness", "top", "bottom", "front", "back", "left", "right", "vertical", "horizontal", "top", "bottom", "inside", "outside", "clockwise", "counterclockwise", "axial", "radial" and "circumferential", etc. is based on the orientation or positional relationship shown in the accompanying drawings, and it is only for the convenience of describing the present application and simplifying the description, rather than indicating or implying that the referred device or element must have a particular orientation, be configured and operate in a particular orientation, and therefore should not be construed as a limitation of the present application.

In addition, terms "first" and "second" are used for descriptive purposes only and are not to be construed as indicating or implying relative importance or implicitly specifying the number of technical features indicated. Thus, the features qualified with "first" and "second" may explicitly or implicitly include at least one such feature. In the description of this application, "plurality" means at least two, such as two, three, etc., unless otherwise expressly and specifically limited.

In this application, unless otherwise expressly specified and limited, terms "mounted", "connection", "connected", "fixed" and other terms should be interpreted in a broad sense, for example, it can be a fixed connection, a detachable connection, or an integrated; it can be a mechanical connection or an electrical connection; it can be a direct connection or an indirect connection through an intermediate medium; it may be connection within the two elements or an interaction relationship between the two elements, unless explicitly defined otherwise. For those of ordinary skill in the art, the specific meanings of the above-mentioned terms in this application can be understood according to specific situations.

In this application, unless otherwise expressly stipulated and limited, first feature "on" or "under" the second feature may be that first and second features are in direct contact, or that first and second features are indirectly contacted through an intermediary. Also, the first feature being "above", "over" and "on top of" the second feature may mean that the first feature is directly above or obliquely above the second feature, or simply means that the first feature is level higher than the second feature. The first feature being "below", "under" and "at bottom of" the second feature may mean that the first feature is directly below or obliquely below the second feature, or simply means that the first feature has a lower level than the second feature.

It should be noted that when an element is referred to as being "fixed to" or "provided on" another element, it can be directly on another element or an intervening element may also be present. When an element is referred to as being "connected" to another element, it can be directly connected to another element or an intervening element may also be present. Terms "vertical", "horizontal", "upper", "lower", "left", "right" and similar expressions used herein are for the purpose of illustration only and do not represent the only embodiment.

Figure 1:
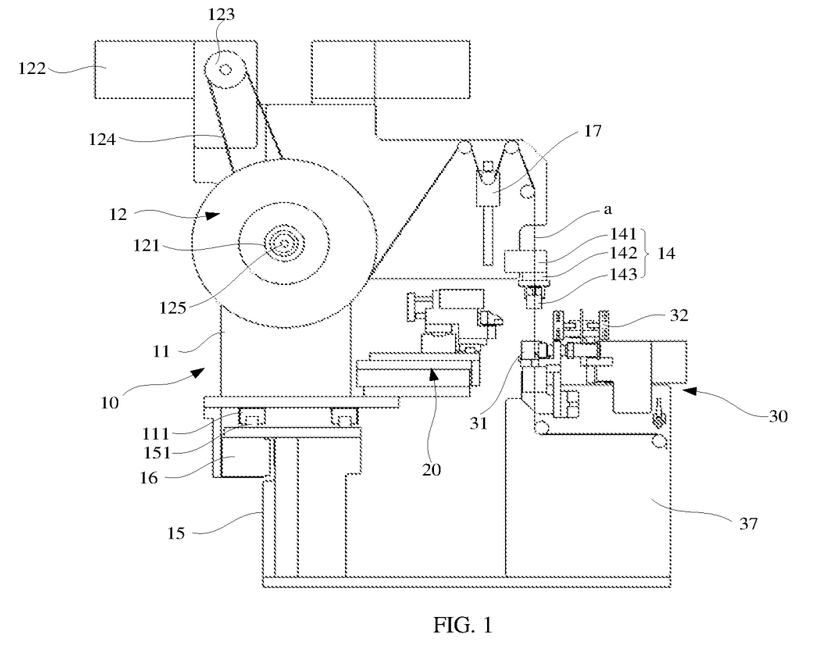
FIG. 1 is a schematic structural view of a roll replacing device in an embodiment of the present application.

Referring to FIG. 1, a roll replacing device is provided in an embodiment of the present application and comprises an unwinding mechanism 10, a first fixing mechanism 14, a second fixing mechanism 30, a cutting mechanism 20, and a strip connection mechanism 32.

The unwinding mechanism 10 comprises a sliding bracket 11 and an unwinding assembly (not shown) mounted on the sliding bracket 11. The sliding bracket 11 is configured to controllably move along a first direction. The unwinding assembly is used for outputting a working material strip and a spare material strip. That is, the unwinding assembly can output two material strips, wherein one of the two material strips is the working material strip, and another one is the spare material strip. The first fixing mechanism 14 is provided on the sliding bracket 11 to move with the sliding bracket 11 along the first direction. The first fixing mechanism 14 is located downstream of the unwinding assembly, and is capable of controllably fixing the working material strip and the spare material strip output from the unwinding assembly. The second fixing mechanism 30 is arranged downstream of the first fixing mechanism 14 to form a strip connection station c between the first fixing mechanism 14 and the second fixing mechanism 30. The second fixing mechanism 30 is capable of controllably fixing a working material strip and a spare material strip passing through the first fix mechanism 14. Wherein the working material strip and the spare material strip located between the first fixing mechanism 14 and the second fixing mechanism 30 (i.e., the strip connection station c) are arranged at intervals along the first direction. The cutting mechanism 20 is arranged corresponding to the strip connection station c, and is used for cutting off the working material strip and the spare material strip located at the strip connection station c. The strip connection mechanism 32 is arranged corresponding to the strip connection station c. Preferably, the cutting assembly 20 is provided on the sliding bracket 11 to move with the sliding bracket 11 along the first direction.

Wherein, the first fixing mechanism 14 is capable of following the sliding bracket 11 to move along the first direction until the spare material strip fixed by the first fixing mechanism 14 and the working material strip fixed by the second fixing mechanism 30 are aligned at the strip connection station c, and the strip connection mechanism 32 is allowed to connect the working material strip and the spare material strip which are aligned at the strip connection station c.

In the above-mentioned roll replacing device, in actual operations, the working material strip unwound and output from the unwinding assembly passes through the first fixing mechanism 14, the strip connection station c, and the second fixing mechanism 30 successively, and is conveyed downstream. A starting end of the spare material strip unwound and output from the unwinding assembly passes through the first fixing mechanism 14 and the strip connection station c successively and is fixed to the second fixing mechanism 30.

When the working material strip on the unwinding assembly is used up and needs to be replaced, firstly, the first fixing mechanism 14 fixes the working material strip and the spare material strip unwound and output from the unwinding assembly at a same time, and the second fixing mechanism 30 also fixes the working material strip (at this time, the working material strip is jointly fixed by the first fixing mechanism 14 and the second fixing mechanism 30, and the spare material strip is also jointly fixed by the first fixing mechanism 14 and the second fixing mechanism 30). Then, the cutting mechanism 20 cuts off the working material strip and the spare material strip located at the strip connection station c. Then, the sliding bracket 11 drives the first fixing mechanism 14 to move along the first direction until a cut-off end of the spare material strip fixed to the first fixing mechanism 14 and a cut-off end of the working material strip fixed to the second fixing mechanism 30 are aligned at the strip connection station c. Then, the strip connection mechanism 32 connects the cut-off end of the working material strip and the cut-off end of the spare material strip which are aligned at the strip connection station c. Finally, the first fixing mechanism 14 releases the fixing of the spare material strip and the second fixing mechanism 30 also releases the fixing of the working material strip, so that the spare material strip unwound and output from the unwinding assembly passes through the first fixing mechanism 14, the strip connection station c, and the second fixing mechanism 30 successively and is conveyed downstream, i.e., the spare material strip unwound and output from the unwinding assembly is converted into a working material strip. In addition, at this time, a used-up material roll on the unwinding assembly can be replaced, and the material strip output from a new material roll can be used as a spare material strip, and the starting end of the spare material strip is pulled out of the first fixing mechanism 14 and the strip connection station c successively and fixed to the second fixing mechanism 30 in preparation for next roll replacing.

In this way, the roll replacing device of the present application can realize automatic switching of the working material strip and the spare material strip (i.e., automatic roll replacing), which greatly reduces downtime, improves productivity, and reduces labor cost compared to a manual roll replacing method used in the prior art. It should be noted that the working material strip refers to the material strip that is unwound and output from the unwinding assembly, passes through the first fixing mechanism 14, the strip connection station c, and the second fixing mechanism 30 successively, and is conveyed downstream. The spare material strip refers to the material strip that is unwound and output from the unwinding assembly and the starting end thereof passes through the first fixing mechanism 14 and the strip connection station c successively, and is fixed to the second fixing mechanism 30 without being conveyed downstream. It can be understood that after the automatic roll replacing, the spare material strip is switched to the working material strip and conveyed downstream, and the material strip unwound from a replaced new material roll is used as the spare material strip.

It should also be noted that the working material strip and the spare material strip unwound and output from the unwinding assembly can be tab material strips. Of course, in some other embodiments, other types of material strips may also be used, which is not limited here.

It should also be noted that in one embodiment, the cutting mechanism 20 is used to cut off the working material strip and the spare material strip at the strip connection station c along a cutting line parallel to the first direction, so that the cut-off end of the spare material strip fixed by the first fixing mechanism 14 and the cut-off end of the working material strip fixed by the second fixing mechanism 30 are aligned in the first direction, so as to prevent the cut-off end of the working material strip and the cut-off end of the spare material strip from overlapping at a place of strip connection. Of course, other forms of the cutting line can also be used to cut off the working material strip and the spare material strip at the strip connection station c, as long as it can be ensured that the cut-off end of the working material strip and the cut-off end of the spare material strip at the place of strip connection do not overlap, which is not limited here.

Specifically, in the embodiment, the unwinding mechanism 10 further includes a base 15 and a switching driving member 16, and the sliding bracket 11 is movably connected to the base 15 along the first direction. The switching driving member 16 is mounted on the base 15 and is connected to the sliding bracket 11 by transmission, so as to drive the sliding bracket 11 to move along the first direction relative to the base 15, thereby driving the first fixing mechanism 14 and the cutting mechanism 20 to move together along the first direction, and thus making the cutting mechanism 20 be fixed relative to the first fixing mechanism 14, ensuring that the working material strip and the spare material strip can always be cut off at the strip connection station c, and enabling the first fixing mechanism 14 to drive the cut-off spare material strip to move until it is aligned with the working material strip fixed by the second fixing mechanism 30, so that the strip connection mechanism 32 can connect strips, thus realizing the switching of the working material strip and the spare material strip. Optionally, the switching driving member 16 may be a cylinder.

Further, the base 15 is mounted with a switching sliding rail 151, and the sliding bracket 11 is mounted with a switching sliding block 111, and the switching sliding block 111 is slidably cooperated with the switching sliding rail 151, so that the sliding bracket 11 is movable along the first direction relative to the base 15 by sliding the switching sliding block 111 relative to the switching sliding rail 151, and making movement of the sliding bracket 11 more stable and reliable. Of course, in other embodiments, the switching sliding block 111 can also be mounted on the base 15, and the switching sliding rail 151 can be mounted on the sliding bracket 11, as long as it can realize that the sliding bracket 11 is movable along the first direction relative to the base 15, which is not limited here.

In the embodiment of the present application, the unwinding assembly includes a first unwinding assembly 12 and a second unwinding assembly, and the first unwinding assembly 12 and the second unwinding assembly are provided on both sides of the sliding bracket 11 in the first direction, respectively. The first unwinding assembly 12 is used to unwind and output a material strip a that can be used as the working material strip or the spare material strip to the first fixing mechanism 14. The second unwinding assembly is used to unwind and output a material strip b that can be used as the spare material strip or the working material strip to the first fixing mechanism 14. In other words, when the first unwinding assembly 12 unwinds and outputs the material strip a as the working material strip, the second unwinding assembly unwinds and outputs the material strip b as the spare material strip; when the first unwinding assembly 12 unwinds and outputs the material strip a as the spare material strip, the second unwinding assembly unwinds and outputs the material strip b as the working material strip.

Specifically, in the embodiment, the first unwinding assembly 12 includes a first material shaft 121 and a first unwinding driving member 122, and the first material shaft 121 is rotatably connected to the sliding bracket 11 around its own axis. The first unwinding driving member 122 is mounted on the sliding bracket 11 and is connected to the first material shaft 121 by transmission to drive the first material shaft 121 to rotate around its own axis, thereby driving a material roll mounted on the first material shaft 121 to rotate and unwind.

The second unwinding assembly includes a second material shaft and a second unwinding driving member, and the second material shaft is rotatably connected to the sliding bracket 11 around its own axis. The second unwinding driving member is mounted to the sliding bracket 11 and is connected to the second material shaft by transmission to drive the second material shaft to rotate around its own axis, thereby driving a material roll mounted on the second material shaft to rotate and unwind.

Specifically, in the embodiment, the unwinding mechanism 10 further includes a mounting shaft 125 which is fixedly mounted to the sliding bracket 11, and the first material shaft 121 and the second material shaft are respectively sleeved on both ends of the mounting shaft 125 by bearings, such that the first material shaft 121 and the second material shaft can rotate relative to the mounting shaft 125.

Specifically, in the embodiment, the first unwinding driving member 122 can be connected to the first material shaft 121 by a belt transmission structure. Specifically, an output shaft of the first unwinding driving member 122 is mounted with a first driving wheel 123, and a first driven wheel is mounted on the first material shaft 121, and a first transmission belt 124 is sleeved between the first driving wheel 123 and the first driven wheel, so that the first unwinding driving member 122 drives the first driving wheel 123 to rotate, and the first driving wheel 123 drives the first driven wheel to rotate through the first transmission belt 124, and the first driven wheel then drives the first material shaft 121 to rotate, thus realizing rotating and unwinding of the material strip a by the material roll installed on the first material shaft 121. Optionally, the first unwinding driving member 122 may be a motor.

Of course, in other embodiments, the first unwinding driving member 122 may also be connected to the first material shaft 121 by transmission by other transmission structures, such as chain transmission structures, gear transmission structures, etc., which is not limited here.

Specifically, in the embodiment, the second unwinding driving member can be connected to the second material shaft by a belt transmission structure. Specifically, an output shaft of the second unwinding driving member is mounted with a second driving wheel, and the second material shaft is mounted with a second driven wheel, and a second transmission belt is sleeved between the second driving wheel and the second driven wheel, so that the second unwinding driving member drives the second driving wheel to rotate, and the second driving wheel drives the second driven wheel to rotate through the second transmission belt, and the second driven wheel then drives the second material shaft to rotate, thus realizing unwinding and outputting of the material strip by the material roll installed on the second material shaft. Optionally, the second unwinding driving member may be a motor.

Of course, in other embodiments, the second unwinding driving member may also be connected to the second material shaft by transmission by other transmission structures, such as chain transmission structures, gear transmission structures, etc., which is not limited here.

In the embodiment of the present application, the first fixing mechanism 14 and the second fixing mechanism 30 are respectively located on both sides of the strip connection station c in a third direction perpendicular to the first direction, and the cutting mechanism 20 and the strip connection mechanism 32 are respectively located on both sides of the strip connection station c in a second direction, and the second direction is perpendicular to the first direction and the third direction, so that the first fixing mechanism 14, the second fixing mechanism 30, the cutting mechanism 20, and the strip connection mechanism 32 are more compactly arranged around the strip connection station c, and the structure of the roll replacing device is compact and conducive to improving space utilization.

Specifically, in the embodiment shown in FIG. 1, the first direction is a direction perpendicular to a paper surface, the second direction is a left-and-right direction, and the third direction is an up-and-down direction. The first fixing mechanism 14 is located above the strip connection station c, the second fixing mechanism 30 is located below the strip connection station c, the cutting mechanism 20 is located on a left side of the strip connection station c, and the strip connection mechanism 32 is located on a right side of the strip connection station c.

Figure 2:
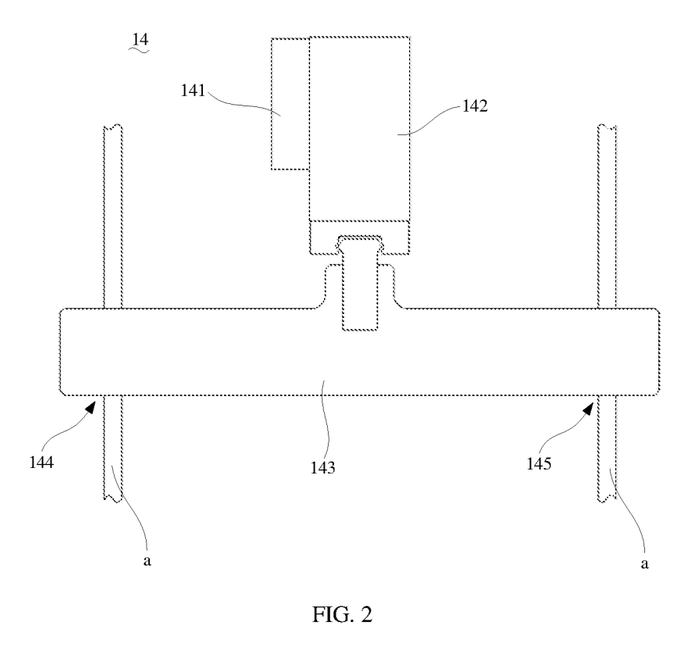
FIG. 2 is a schematic structural view of a first fixing mechanism of the roll replacing device shown in FIG. 1.

Referring to FIG. 1 and FIG. 2, in the embodiment of the present application, the first fixing mechanism 14 has a first fixing position 144 and a second fixing position 145 arranged at intervals along the first direction. The first fixing position 144 and the second fixing position 145 are used to fix the working material strip and the spare material strip. In this way, one of the material strips unwound and output from the unwinding assembly enters the strip connection station c through the first fixing position 144, and another material strip enters the strip connection station c through the second fixing position 145, and the first fixing mechanism 14 fixes the two material strips (i.e., the working material strip and the spare material strip) to the first fixing position 144 and the second fixing position 145 respectively when the roll needs to be replaced, so as to realize simultaneous fixing of the working material strip and the spare material strip.

Specifically, in the embodiment, the first fixing mechanism 14 includes a clamping driving member 142 mounted on the sliding bracket 11 and two clamping blocks 143 drivingly connected with the clamping driving member 142. The first fixing position 144 and the second fixing position 145 are formed between the two clamping blocks 143. The clamping driving member 142 is used to drive the two clamping blocks 143 to tightly clamp or release each other. When the clamping driving member 142 drives the two clamping blocks 143 to tightly clamp with each other, the two clamping blocks 143 simultaneously tightly clamp the two material strips unwound and output from the unwinding assembly at the first fixing position 144 and the second fixing position 145, respectively. When the clamping driving member 142 drives the two clamping blocks 143 to release, the two clamping blocks 143 simultaneously release clamping of the two material strips unwound and output from the unwinding assembly. The first fixing mechanism 14 can realize simultaneous clamping or releasing of the two material strips, a structure of the first fixing mechanism 14 is simple, and the clamping of the two material strips is stable and reliable.

Optionally, the clamping driving member 142 may be a clamping cylinder, and the two clamping blocks 143 are respectively mounted on two clamping driving ends of the clamping cylinder, so that the clamping driving member 142 can drive the two clamping blocks 143 to clamp or release.

Further, the two clamping blocks 143 extend longitudinally along the first direction, and the first fixing position 144 and the second fixing position 145 are respectively located at two longitudinal ends of the two clamping blocks 143. On one hand, the two material strips unwound and output from the unwinding assembly pass through the first fixing position 144 and the second fixing position 145 respectively to prevent the two material strips from interfering with each other when moving; on another hand, when the two clamping blocks 143 tightly clamp, the two material strips unwound and output from the unwinding assembly are tightly clamped at a same time, and when the two clamping blocks 143 release, the two material strips unwound and output from the unwinding assembly are unclamped at a same time.

Specifically, in one embodiment, the first fixing position 144 is arranged corresponding to the first unwinding assembly 12 such that the first fixing position 144 is used to tightly clamp or release the material strip a (the working material strip or the spare material strip) that is unwound and output from the first unwinding assembly 12. The second fixing position 145 is arranged corresponding to the second unwinding assembly, so that the second fixing position 145 is used to tightly clamp or release the material strip (the working material strip or the spare material strip) that is unwound and output from the second unwinding assembly 12.

It should be noted that, of course, in other embodiments, two clamping structures can be provided on the sliding bracket 11 along the first direction, and the two clamping structures are equipped with the first fixing position 144 and the second fixing position 145, respectively. In addition, each clamping structure is used to independently clamp or release one of the material strips unwound and output from the unwinding assembly (i.e., the working material strip or the spare material strip), and it can also clamp or release the working material strip and the spare material strip at a same time, which is not limited here.

Specifically, in the embodiment, the unwinding mechanism 10 further includes a first temporary storage assembly 17 and a second temporary storage assembly. The first temporary storage assembly 17 is mounted on the sliding bracket 11 and arranged between the first unwinding assembly 12 and the first fixing mechanism 14 for temporary storing the material strip a unwound and output from the first unwinding assembly 12. The second temporary storage assembly is mounted on the sliding bracket 11 and arranged between the second unwinding assembly and the first fixing mechanism 14 for temporary storing the material strip unwound and output from the second unwinding assembly.

Figure 3:
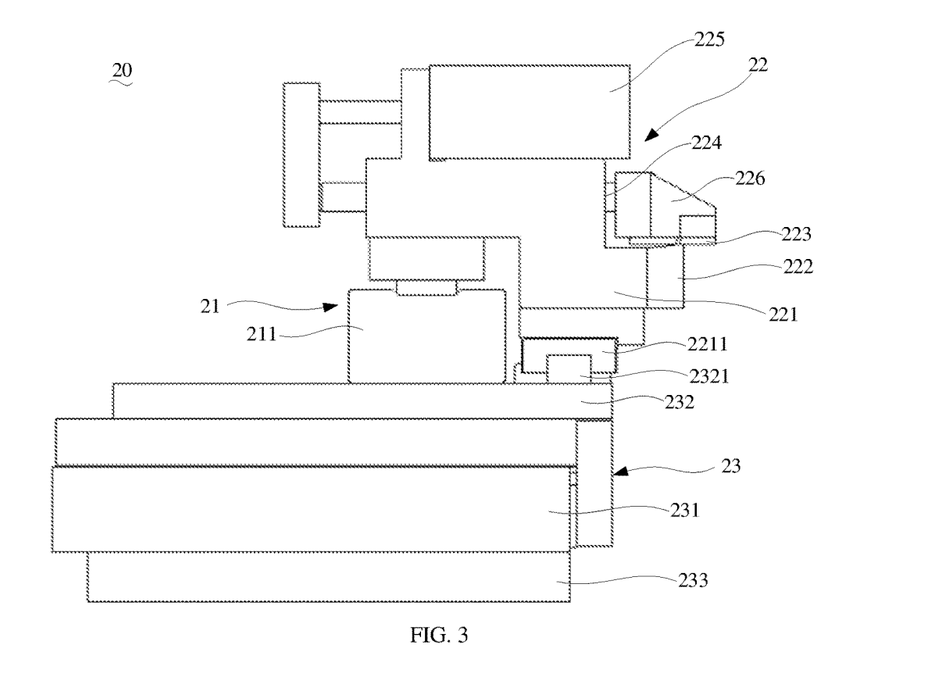
FIG. 3 is a schematic structural view of a cutting mechanism of the roll replacing device shown in FIG. 1.
Figure 4:
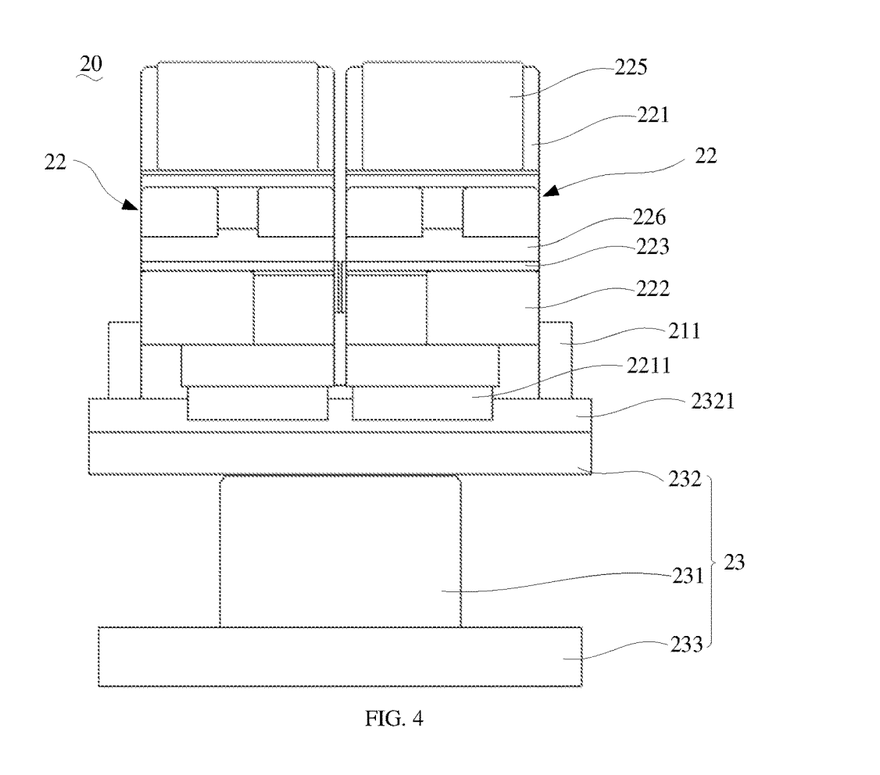
FIG. 4 is a schematic structural view of the cutting mechanism shown in FIG. 3 in another view.

Referring to FIG. 1, FIG. 3, and FIG. 4, in the embodiment of the present application, the cutting mechanism 20 includes an adjusting assembly 21 and two cutting assemblies 22 mated and connected to the adjusting assembly 21. Each cutting assembly 22 has a first cutter 222 and a second cutter 223 cooperated to the first cutter 222 for cutting. The adjusting assembly 21 is provided on the sliding bracket 11 and is capable of controllably driving the two cutting assemblies 22 to move away from each other along the first direction to respective cutting positions for cutting off the working material strip or the spare material strip.

When the two cutting assemblies 22 move to the respective cutting positions, the working material strip and the spare material strip located at the strip connection station c respectively enter between the first cutter 222 and the second cutter 223 of the corresponding cutting assemblies 22, respectively, so that the first cutter 222 and the second cutter 223 of the two cutting assemblies 22 are cooperated for cutting, so as to cut off the working material strip and the spare material strip respectively.

In some embodiments, the cutting mechanism 20 further includes a moving assembly 23, and the moving assembly 23 is provided on the sliding bracket 11 and is connected with the adjusting assembly 21 by transmission to controllably drive the adjusting assembly 21 to move along a fourth direction until both the cutting assemblies 22 are located between the working material strip and the spare material strip at the strip connection station c. Wherein the fourth direction intersects with the first direction. Preferably, the fourth direction is perpendicular to the first direction and parallel to the second direction described above.

In this way, when it is necessary to cut off the working material strip and the spare material strip located at the strip connection station c, firstly, the moving assembly 23 drives the adjusting assembly 21 to move along the fourth direction until the two cutting assemblies 22 are located between the working material strip and the spare material strip located at the strip connection station c, so that the working material strip and the spare material strip are aligned in the first direction with a position between the first cutter 222 and the second cutter 223 of the corresponding cutting assembly 22, respectively. Then, the adjusting assembly 21 drives the two cutting assemblies 22 to move away from each other along the first direction to the cutting positions, so that the working material strip and the spare material strip enter between the first cutter 222 and the second cutter 223 of the corresponding cutting assembly 22, respectively. Then, the first cutter 222 and the second cutter 223 of the two cutting assemblies 22 are cooperated for cutting to cut off the working material strip and the spare material strip, respectively. Finally, the adjusting assembly 21 drives the two cutting assemblies 22 to move close to each other along the first direction to return to their original positions, and the moving assembly 23 drives the adjusting assembly 21 to move reversely along the fourth direction to return to its original position, so as to prevent interference between the cutting mechanism 20 and other components during movement of the sliding bracket 11 along the first direction.

Specifically, in the embodiment, the moving assembly 23 includes a moving driving member 231 mounted to the sliding bracket 11 and a moving plate 232 drivingly connected with the moving driving member 231. The adjusting assembly 21 is mounted to the moving plate 232, and the moving driving member 231 is used to drive the moving plate 232 to move along the fourth direction, thereby driving the adjusting assembly 21 to move along the fourth direction. Optionally, the moving driving member 231 may be a cylinder.

Specifically, in the embodiment, each cutting assembly 22 further includes a mounting base 221 movably connected to the moving plate 232 along the first direction, and the first cutter 222 and the second cutter 223 are mounted to the mounting base 221. The mounting bases 221 of the two cutting assemblies 22 are both drivingly connected with the adjusting assembly 21, so as to be driven by the adjusting assembly 21 to approach or move away from each other along the first direction. When the adjusting assembly 21 drives the mounting bases 221 of the two cutting assemblies 22 to move away from each other, the working material strip and the spare material strip enter between the first cutter 222 and the second cutter 223 of the corresponding cutting assembly 22, respectively, so as to be cut off by the first cutter 222 and the second cutter 223 of the corresponding cutting assembly 22.

Further, the moving plate 232 is equipped with a first sliding rail 2321, and the mounting base 221 is mounted with a first sliding block 2211, and the first sliding block 2211 is slidably cooperated with the first sliding rail 2321, so that the mounting base 221 is movable along the first direction relative to the moving plate 232 by sliding of the first sliding block 2211 along the first sliding rail 2321, and to ensure that movement of the mounting base 221 along the first direction is more stable and reliable.

Further, the adjusting assembly 21 includes a gripper cylinder 211, and two driving ends of the gripper cylinder 211 are respectively connected with the mounting bases 221 of the two cutting assemblies 22, so that the gripper cylinder 211 can drive the mounting bases 221 of the two cutting assemblies 22 to approach or away from each other along the first direction.

Specifically, in the embodiment, each cutting assembly 22 further includes a guiding bar 224 and a cutting driving member 225, and the mounting base 221 is defined with a guiding hole, and the guiding bar 224 is arranged through the guiding hole and is slidably cooperated with the guiding hole. The first cutter 222 is fixedly connected to the mounting base 221, and the second cutter 223 is fixedly connected to one end of the guiding bar 224. The cutting driving member 225 is mounted on the mounting base 221 and is connected with another end of the guiding bar 224 by transmission to drive the guiding bar 224 to move in the guiding hole, thereby driving the second cutter 223 to move relative to the first cutter 222, thereby cutting the material strip (the working material strip or the spare material strip) between the second cutter 223 and the first cutter 222. In this way, movement of the second cutter 223 is guided by the sliding cooperation between the guiding bar 224 and the guiding hole, so as to ensure that the second cutter 223 is cooperated with the first cutter 222 for cutting to cut off the material strip between the second cutter 223 and the first cutter 222 during a moving process. Optionally, the cutting driving member 225 may be a cylinder. The second cutter 223 is fixedly connected to one end of the guiding bar 224 through a cutter base 226.

It should be noted that the cutting mechanism 20 is not limited to being mounted on the sliding bracket 11 and moving with the sliding bracket 11 along the first direction. In some other embodiments, the cutting mechanism 20 may also be provided with a separate driving structure (e.g., a linear module, an electric cylinder, etc.) to drive the cutting mechanism 20 to move along the first direction (specifically, the moving driving member 231 of the moving assembly 23 is mounted on the driving structure), to adjust positional relationship between the two cutting assemblies 22 and the working material strip and the spare material strip located at the strip connection station c, and to ensure that the two cutting assemblies 22 can move to the respective cutting positions for cutting under a driving action of the moving assembly 23 and the adjusting assembly 21.

Figure 5:
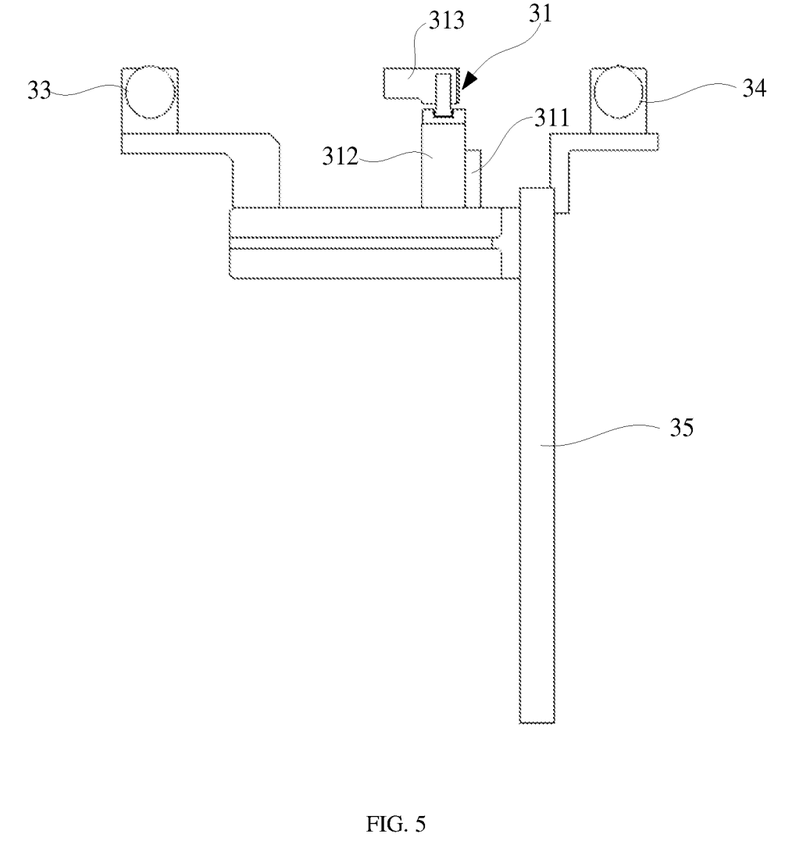
FIG. 5 is a schematic structural view of a second fixing mechanism of the roll replacing device shown in FIG. 1.
Figure 6:
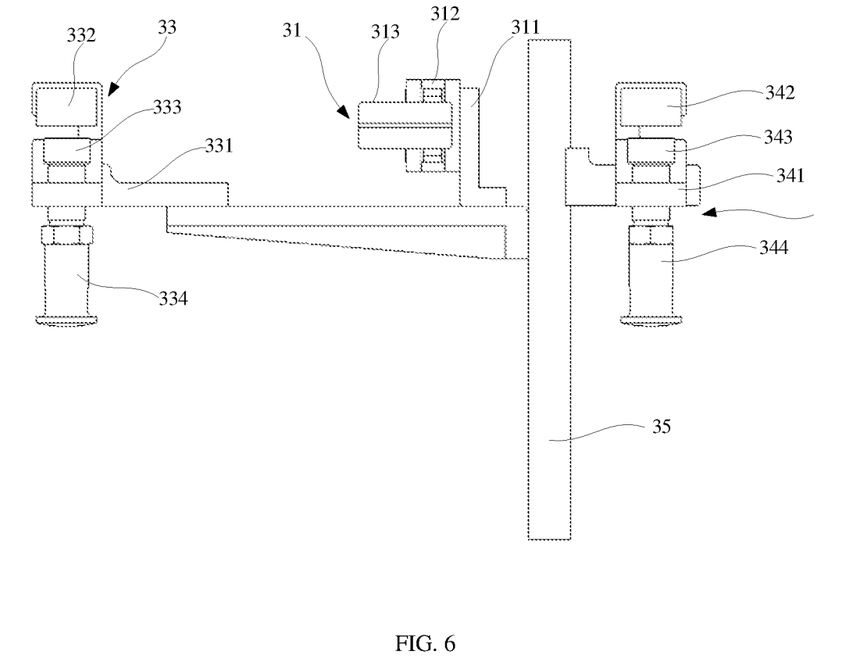
FIG. 6 is a top view of the second fixing mechanism shown in FIG. 5.

Referring to FIG. 1, FIG. 5, and FIG. 6, in the embodiment of the present application, the second fixing mechanism 30 includes a first fixing assembly 33, a second fixing assembly 34, and a third fixing assembly 31, and the first fixing assembly 33 and the second fixing assembly 34 are located on both sides of the third fixing assembly 31 in the first direction, respectively. During the movement of the sliding bracket 11 along the first direction, the first fixing position 144 and the second fixing position 145 can be alternately aligned with the third fixing assembly 31.

Wherein the second fixing position 145 is aligned with the second fixing assembly 34 when the first fixing position 144 is aligned with the third fixing assembly 31, so that the second fixing assembly 34 fixedly connects a spare material strip passing through the second fixing position 145. At this moment, the working material strip passing through the first fixing position 144 continues to pass through the strip connection station c and the third fixing assembly 31 and is conveyed downstream.

When the second fixing position 145 is aligned with the third fixing assembly 31, the first fixing position 144 is aligned with the first fixing assembly 33 such that the first fixing assembly 33 fixedly connects a spare material strip passing through the first fixing assembly 144. At this moment, the working material strip passing through the second fixing position 145 continues to pass through the strip connection station c and the third fixing assembly 31 and is conveyed downstream.

In this way, the first fixing assembly 33 or the second fixing assembly 34 is used to connect and fix the starting end of the spare material strip, so that the cutting assembly 22 can cut off the working material strip and the spare material strip at the strip connection station c at a same time, which is beneficial to improve a cutting effect. It can be understood that, the working material strip and the spare material strip are respectively cut off by the above-mentioned two cutting assemblies 22 of the cutting mechanism 20.

Specifically, in the embodiment, a first position and a second position are provided in a process of the sliding bracket 11 moving along the first direction.

When the sliding bracket 11 moves to the first position, the first fixing position 144 is aligned with the first fixing assembly 33, so that the spare material strip passing through the first fixing position 144 is fixedly connected to the first fixing assembly 33. At a same time, the second fixing position 145 is aligned with the third fixing assembly 31, so that the working material strip passing through the second fixing position 145 continues to pass through the strip connection station c and the third fixing assembly 31, and is conveyed downstream.

When the sliding bracket 11 moves to the second position, the first fixing position 144 is aligned with the third fixing assembly 31, so that the working material strip passing through the first fixing position 144 continues to pass through the strip connection station c and the third fixing assembly 31, and is conveyed downstream. At a same time, the second fixing position 145 is aligned with the second fixing assembly 34, so that the spare material strip passing through the second fixing position 145 is fixedly connected to the second fixing assembly 34.

Specifically, in the embodiment, the first fixing assembly 33 includes a first bracket 331, a first fixed clamping block 332, and a first movable clamping block 333. The first fixed clamping block 332 is fixedly connected to the first bracket 331, and the first movable clamping block 333 is provided on the first bracket 331 and is configured to be able to approach or away from the first fixed clamping block 332. When the first fixing position 144 is aligned with the first fixing assembly 33, the spare material strip passing through the first fixing position 144 is inserted between the first fixed clamping block 332 and the first movable clamping block 333. Then the first movable clamping block 333 moves to the first fixed clamping block 332 to tightly clamp the spare material strip between them, so as to realize clamping and fixing of the spare material strip, so that the cutting mechanism 20 can cut off the spare material strip when the roll is replaced. Optionally, the first movable clamping block 333 is mounted on the first bracket 331 through a first knob plunger 334, so that the first movable clamping block 333 can be driven to approach or move away from the first fixed clamping block 332 by screwing the first knob plunger 334.

It should be noted that, the first fixed assembly 33 can also use other structures, such as vacuum suction plates or gripper cylinders, as long as they can fix the starting end of the spare material strip passing through the first fixing position 144, which is not limited here.

Specifically, in the embodiment, the second fixing assembly 34 includes a second bracket 341, a second fixed clamping block 342, and a second movable clamping block 343. The second fixed clamping block 342 is fixedly connected to the second bracket 341, and the second movable clamping block 343 is provided on the second bracket 341 and is configured to be able to approach or away from the second fixed clamping block 342. When the second fixing position 145 is aligned with the second fixing assembly 34, the spare material strip passing through the second fixing position 145 is inserted between the second fixed clamping block 342 and the second movable clamping block 343. Then the second movable clamping block 343 moves to the second fixed clamping block 342 to tightly clamp the spare material strip between them, so as to realize clamping and fixing of the spare material strip, so that the cutting mechanism 20 can cut off the spare material strip when the roll is replaced. Optionally, the second movable clamping block 343 is mounted on the second bracket 341 through a second knob plunger 344, so that the second movable clamping block 343 can be driven to approach or move away from the second fixed clamping block 342 by screwing the second knob plunger 344.

It should be noted that, the second fixed assembly 34 can also use other structures, such as vacuum suction plates or gripper cylinders, as long as they can fix the starting end of the spare material strip passing through the second fixing position 145, which is not limited here.

Specifically, in the embodiment, the third fixing assembly 31 includes a third bracket 311, a gripping driving member 312, and two gripping blocks 313, and the gripping driving member 312 is mounted to the third bracket 311. The two gripping blocks 313 are connected to the gripping driving member 312, so as to be driven by the gripping driving member 312 to tightly clamp or release the working material strip between the two gripping blocks 313. Optionally, the gripping driving member 312 may be a gripper cylinder. It should be noted that in other embodiments, the third fixing assembly can also use other structures, such as vacuum suction plates or the like, as long as they can fix the working material strip, which is not limited here.

Further, the second fixing mechanism 30 also includes a fixed frame 35; the first bracket 331, the second bracket 341, and the third bracket 311 are all fixedly connected to the fixed frame 35, so that the first fixed assembly 33, the third fixed assembly 31, and the second fixed assembly 34 are integrally mounted on the fixed frame 35 in order to improve the space utilization and facilitate disassembly and assembly.

Figure 7:
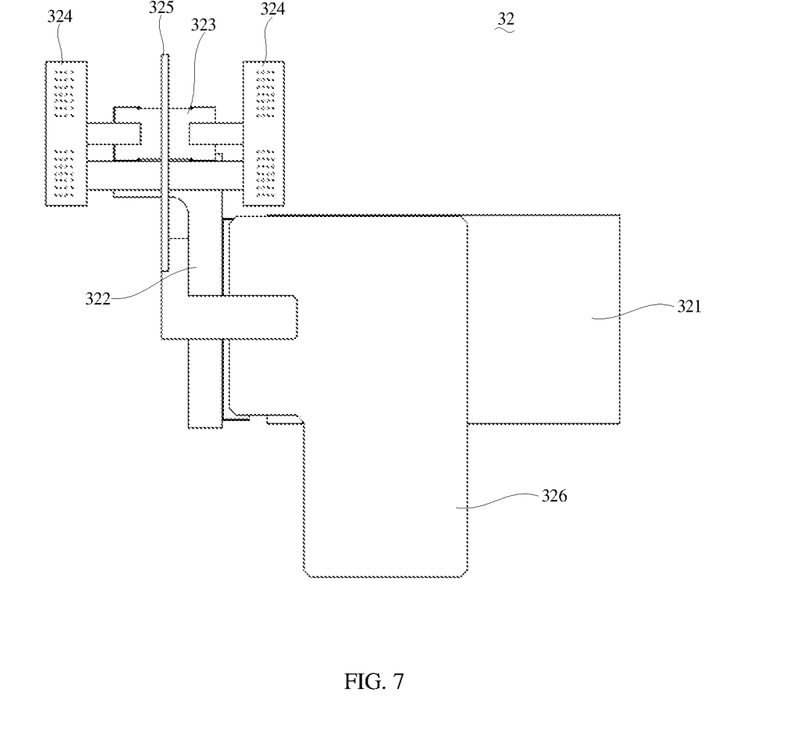
FIG. 7 is a schematic structural view of a strip connection mechanism of the roll replacing device shown in FIG. 1.

Referring to FIG. 1 and FIG. 7, in the embodiment of the present application, the strip connection mechanism 32 includes a tape sticking assembly, and the tape sticking assembly comprises a tape sticking driving member 323 and two tape sticking suction cups 324 drivingly connected to the tape sticking driving member 323, and at least one of the two tape sticking suction cups 324 is used to suck up adhesive tapes. The tape sticking driving member 323 is used to drive the two tape sticking suction cups 324 to be in a closed state, so as to stick the adhesive tapes on the tape sticking suction cups 324 to the aligned cut-off end of the working material strip and the cut-off end of the spare material strip at the strip connection station c, so that connection of the spare material strip and the working material strip can be realized. In this way, the adhesive tape is stuck to the cut-off end of the working material strip and the cut-off end of the spare material strip between the two tape sticking suction cups 324 by closing of two tape sticking suction cups 324, thus realizing the connection of the working material strip and the spare material strip. A structure of the tape sticking assembly is simple, and adhesive action is simple and reliable, making adhesive efficiency higher and a better adhesive effect. It can be understood that when there is only one tape sticking suction cup 324 used to suck up the adhesive tape, another tape sticking suction cup 324 may not have an adsorption function (i.e., it does not need to be connected to an external negative pressure source, and may not open an adsorption hole connected to an external air source), but only serve to match and close the tape sticking suction cup 324 used to suck up the adhesive tape to ensure that the adhesive tape is stuck to a connection point between the working material strip and the spare material strip.

Specifically, in the embodiment, the strip connection mechanism 32 further includes a translation driving member 321 and a driving block 322. The translation driving member 321 is drivingly connected with the driving block 322. The tape sticking driving member 323 is mounted on the driving block 322, and the translation driving member 321 is used to drive the driving block 322 to move between a tape spare position and a tape sticking position. When the driving block 322 moves to the tape spare position, the tape sticking suction cup 324 sucks up the adhesive tape. When the driving block 322 moves to the tape sticking position, the tape sticking driving member 323 drives the two tape sticking suction cups 324 to close together to be in a closed state, so as to stick the adhesive tape to the working material strip and the spare material strip. Optionally, the tape spare position and the tape sticking position are arranged along the second direction.

In this way, when the strips need to be connected, firstly, the translation driving member 321 drives the driving block 322 to move to the tape spare position, causing the tape sticking suction cup 324 to suck up the adhesive tape. Then, the translation driving member 321 drives the driving block 322 to move to the tape sticking position. At this time, the cut-off end of the working material strip and the cut-off end of the spare material strip aligned at the strip connection station c are located between the two tape sticking suction cups 324. Then, the tape sticking driving member 323 drives the two tape sticking suction cups 324 to close together to squeeze the cut-off end of the working material strip and the cut-off end of the spare material strip, so as to stick the adhesive tape on the tape sticking suction cups 324 to the cut-off end of the working material strip and the cut-off end of the spare material strip, so that the cut-off end of the working material strip and the cut-off end of the spare material strip are connected to each other by the adhesive tape. Finally, the tape sticking driving member 323 drives the tape sticking suction cups 324 to open (at this time, the tape sticking suction cups 324 can be controlled to stop sucking up the adhesive tape so that the tape sticking suction cups 324 can be separated from the adhesive tape), and the translation driving member 321 drives the driving block 322 to return to the tape spare position to prepare for next adhesive sticking. Optionally, the translation driving member 321 may be a cylinder.

Further, the strip connection mechanism 32 also includes a tape spare plate 325 mounted on a fixing base 37, and the tape spare plate 325 is located at the tape spare position, and at least one side surface is used for sticking the adhesive tape.

When the translation driving member 321 drives the driving block 322 to move to the tape spare position, the tape spare plate 325 is located between the two tape sticking suction cups 324. At this time, the tape sticking driving member 323 drives the two tape sticking suction cups 324 to close together, so that the tape sticking suction cups 324 suck up the adhesive tape on the tape spare plate 325. Then the tape sticking driving member 323 drives the two tape sticking suction cups 324 to open (at this time, the adhesive tape on the tape spare plate 325 has been sucked up by the tape sticking suction cups 324, so that the adhesive tape is separated from the tape spare plate 325). After the adhesive tape on the tape spare plate 325 is sucked away by the tape sticking suction cups 324, a new adhesive tape can be re-stuck on at least one side of the tape spare plate 325 by manual or an automatic apparatus for the tape sticking suction cups 324 to suck again.

It should be noted that, in order to improve a strip connection effect, the two tape sticking suction cups 324 both need to suck up the adhesive tape, so that the adhesive tape is stuck on both sides of the cut-off end of the working material strip and the cut-off end of the spare material strip. Therefore, adhesive tapes need to be stuck on opposite sides of the tape spare plate 325 so that the two tape sticking suction cups 324 can suck up the adhesive tapes at a same time.

In the embodiment of the present application, the tape sticking driving member 323 is used to drive the two tape sticking suction cups 324 to rotate in opposite directions to each other to the above-mentioned closed state and a flat state. In this way, when the translation driving member 321 drives the driving block 322 to move to the tape spare position or the tape sticking position, the tape sticking driving member 323 drives the two tape sticking suction cups 324 to rotate in opposite directions to each other to the closed state, so that the two tape sticking suction cups are closed, thereby realizing the sucking up or sticking of the adhesive tape. When the sucking up of the adhesive tapes is completed and it is necessary to move to the tape sticking position, or the sticking of the adhesive tapes is completed and it is necessary to move to the tape spare position, in order to prevent interference of the two tape sticking suction cups 324 during the movement, the tape sticking driving member 323 drives the two tape sticking suction cups 324 to rotate in opposite directions to each other to the flat state, ensuring that the two tape sticking suction cups 324 will not interfere with other parts such as the material strip or the tape spare plate 325 during the movement process. It can be understood that the two tape sticking suction cups 324 can be in the closed state by turning approximately 90° from the flat state to a direction in which they are close to each other. Similarly, the two tape sticking suction cups 324 can be in the flat state by turning approximately 90° from the closed state to a direction in which they are apart from each other. When the two tape sticking suction cups 324 are in the flat state, the two tape sticking suction cups 324 are in a same plane to ensure a position avoidance effect. Optionally, the tape sticking driving member 323 may be a gripper cylinder.

It should be noted that the two tape sticking suction cups 324 are not limited to be closed or opened by rotating in opposite directions to each other to achieve sucking up or sticking of the adhesive tape. In other embodiments, the two tape sticking suction cups 324 may also be used in a translational manner to close or open to achieve sucking up or sticking of the adhesive tape, which is not limited here. Of course, when the two tape sticking suction cups 324 are closed or opened in the translational manner, an additional avoidance driving cylinder is required. After the two tape sticking suction cups 324 suck up the adhesive tape or stick the adhesive tape, it is necessary to use the avoidance driving cylinder to drive the two tape sticking suction cups 324 to move (for example, move along the first direction), so that the tape spare plate 325 or the spare material strip and the working material strip exit from a position between the two tape sticking suction cups 324 to achieve the effect of avoidance. It should be noted that, as for driving the two tape sticking suction cups 324 to translate and using the avoidance driving cylinder to drive the two tape sticking suction cups 324 to avoid, a relatively mature prior art can be used, which will not be repeated here.

In the embodiment of the present application, the strip connection mechanism 32 further includes a strip connection base 326 on which the translation driving member 321 is fixedly mounted, and the tape spare plate 325 is fixedly connected to the strip connection base 326 through a tape spare bracket 327. In this way, the strip connection mechanism 32 is integrally mounted on the strip connection base 326, which is beneficial to improve the space utilization and facilitate disassembly and assembly.

Specifically, in the embodiment, the roll replacing device further comprises the fixing base 37 (see FIG. 1) and a base plate 50 (see FIG. 1); both the strip connection base 326 and the fixing frame 35 are fixedly mounted on the fixing base 37, and a base 15 and the fixing base 37 are both fixedly mounted on the base plate 50, so that the unwinding mechanism 10 of the roll replacing device, the first fixed mechanism 14 of the roll replacing device, the second fixed mechanism 30 of the roll replacing device, the cutting mechanism 20 of the roll replacing device, and the strip connection mechanism 32 of the roll replacing device are integrated on the base plate 50, which makes the roll replacing device well integrated into a tab welding apparatus and helps improve an overall space utilization of the apparatus.

The following takes a case where the material strip a unwound and output from the first unwinding assembly 12 is used as the working material strip, and the material strip b unwound and output from the second unwinding assembly is used as the spare material strip (that is, the sliding bracket 11 is located in the second position) as an example to describe the roll replacing process:

Initially, the sliding bracket 11 is in the second position, and the working material strip unwound and output from the first unwinding assembly 12 passes through the first fixing position 144 between the two clamping blocks 143 into the strip connection station c, and further passes through the two gripping blocks 313 of the third fixing assembly 31, and continues to be conveyed downstream. The starting end of the spare material strip unwound and output from the second unwinding assembly passes through the second fixing position 145 between the two clamping blocks 143 into the strip connection station c and is tightly clamped and fixed between the second movable clamping block 343 of the second fixing assembly 34 and the second fixed clamping block 342 of the second fixing assembly 34.

When a material roll on the first unwinding assembly 12 is used up and needs to be replaced, firstly, the two clamping blocks 143 of the first fixing mechanism 14 tightly clamp the working material strip unwound and output from the first unwinding assembly 12 and the spare material strip unwound and output from the second unwinding assembly (that is, the working material strip is tightly clamped and fixed at the first fixing position 144, and the spare material strip is tightly clamped and fixed at the second fixing position 145). In addition, the two gripping blocks 313 of the third fixing assembly 31 also tightly clamp and fix the working material strip. The cutting mechanism 20 cuts off the working material strip between the first fixing position 144 and the third fixing assembly 31 and the spare material strip between the second fixing position 145 and the second fixing assembly 34.

Then, the sliding bracket 11 moves to the first position along the first direction, so that the second fixing position 145 is aligned with the third fixing assembly 31, so the cut-off end of the spare material strip tightly clamped at the second fixing position 145 is aligned with the cut-off end of the working material strip tightly clamped between the two gripping blocks 313 of the third fixing assembly 31. The translation driving member 321 of the strip connection mechanism 32 drives the driving block 322 to move to the tape sticking position, and the tape sticking driving member 323 drives the two tape sticking suction cups 324 to be in a closed state, in order to connect the cut-off end of the spare material strip tightly clamped and fixed at the second fixing position 145 with the cut-off end of the working material strip tightly clamped and fixed between the two gripping blocks 313 of the third fixing assembly 31, i.e., to achieve the strip connection.

Finally, the two clamping blocks 143 of the first fixing mechanism 14 release the clamping of the working material strip unwound and output from the first unwinding assembly 12 and the spare material strip unwound and output from the second unwinding assembly, and the two gripping blocks 313 of the third fixing assembly 31 also release the clamping of the working material strip, so that the spare material strip unwound and output from the second unwinding assembly passes through the second fixing position 145, the strip connection station c, and the two gripping blocks 313 of the third fixing assembly 31 successively, and is conveyed downstream as the working material strip, that is, the roll replacing is completed.

At this time, a used-up material roll on the first unwinding assembly 12 can be replaced, and a material strip output from a replaced new material roll can be used as the spare material strip, and starting end of the spare material strip passes through the first fixing position 144 and is tightly clamped and fixed to the first fixing assembly 33 to prepare for the next roll replacing.

It should be noted that in a case where the material strip a unwound and output from the first unwinding assembly 12 serves as the spare material strip, and the material strip b unwound and output from the second unwinding assembly serves as the working material strip, the roll replacing process is similar to the above roll replacing process, so it will not be repeated here.

Figure 8:
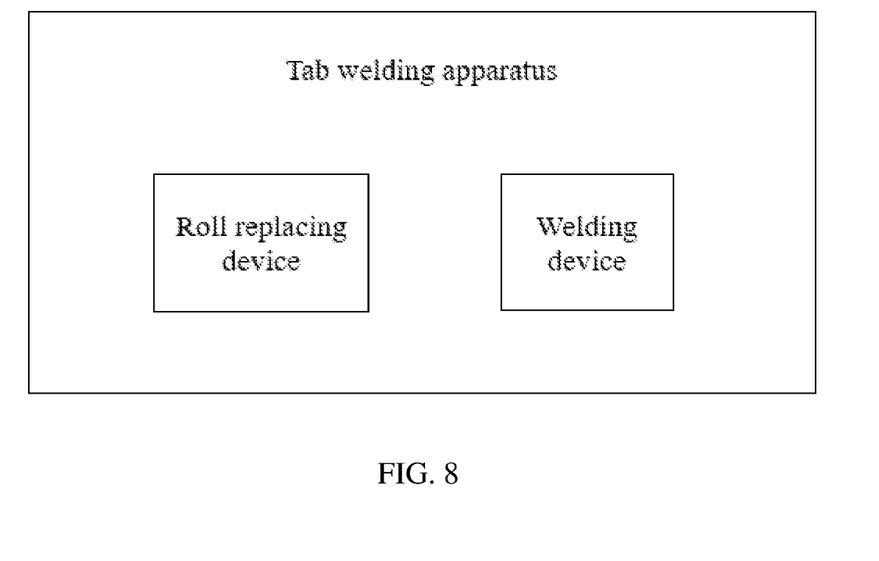
FIG. 8 is a block diagram of a tab welding apparatus provided in embodiments of the present application.

Based on the above roll replacing device, the present application also provides a tab welding apparatus for cutting off a working material strip to form a tab, and welding the tab on a plate. The tab welding apparatus includes a roll replacing device as described in any of the above embodiments for conveying the working material strip downstream. It can be understood that the working material strip is a tab material strip.

Specifically, the tab welding apparatus further includes a welding device, which is arranged downstream of the roll replacing device, for cutting off the working material strip conveyed by the roll replacing device to form a tab and welding the tab to the plate.

The technical features of the above-described embodiments can be combined in any number of ways. For the sake of brevity, not all possible combinations of the technical features of the above-described embodiments have been described. However, as long as there is no contradiction in the combination of these technical features, such technical features should be considered the scope of this specification.

The above described embodiments express only several embodiments of the present application, and their descriptions are more specific and detailed, but they should not be construed as a limitation of the scope of the patent application. It should be noted that for a person of ordinary skill in the art, several variations and improvements can be made without departing from the conception of the present application, and these belong to the scope of protection of the present application. Therefore, the scope of protection of the patent application shall be subject to the attached claims.

What is claimed is:

1. A roll replacing device, comprising:
an unwinding mechanism comprising a sliding bracket and an unwinding assembly mounted on the sliding bracket; the sliding bracket is configured to controllably move along a first direction, and the unwinding assembly is used for outputting a working material strip and a spare material strip;
a first fixing mechanism provided on the sliding bracket and located downstream of the unwinding assembly, capable of controllably fixing the working material strip and the spare material strip output from the unwinding assembly;
a second fixing mechanism arranged downstream of the first fixing mechanism to form a strip connection station between the first fixing mechanism and the second fixing mechanism, the second fixing mechanism capable of controllably fixing the working material strip and the spare material strip passing through the first fixing mechanism; wherein the working material strip and the spare material strip located between the first fixing mechanism and the second fixing mechanism are arranged at intervals along the first direction;
a cutting mechanism used for cutting off the working material strip and the spare material strip at the strip connection station; and
a strip connection mechanism arranged corresponding to the strip connection station;
wherein the first fixing mechanism is capable of following the sliding bracket to move along the first direction until the spare material strip fixed by the first fixing mechanism and the working material strip fixed by the second fixing mechanism are aligned at the strip connection station, and allows the strip connection mechanism to connect the working material strip and the spare material strip which are aligned at the strip connection station.

2. The roll replacing device according to claim 1, wherein the first fixing mechanism and the second fixing mechanism are respectively located on both sides of the strip connection station in a third direction perpendicular to the first direction, and the cutting mechanism and the strip connection mechanism are respectively located on both sides of the strip connection station in a second direction, and the second direction is perpendicular to the first direction and the third direction.

3. The roll replacing device according to claim 1, wherein the cutting mechanism comprises an adjusting assembly and two cutting assemblies mated and connected to the adjusting assembly, and each of the cutting assemblies has a first cutter and a second cutter cooperated to the first cutter for cutting;
the adjusting assembly is provided on the sliding bracket and is capable of controllably driving the two cutting assemblies to move away from each other in the first direction to respective cutting positions for cutting off the working material strip or the spare material strip; and
when the two cutting assemblies move to the respective cutting positions, the working material strip and the spare material strip at the strip connection station respectively enter between the first cutter and the second cutter of corresponding cutting assemblies, respectively.

4. The roll replacing device according to claim 3, wherein the cutting mechanism further comprises a moving assembly, the moving assembly is provided on the sliding bracket and is connected with the adjusting assembly by transmission, to controllably drive the adjusting assembly to move along a fourth direction at an angle to the first direction until both the cutting assemblies are located between the working material strip and the spare material strip at the strip connection station.

5. The roll replacing device according to claim 4, wherein the moving assembly comprises a moving driving member mounted to the sliding bracket and a moving plate drivingly connected with the moving driving member; the adjusting assembly is mounted to the moving plate, and the moving driving member is used to drive the moving plate to move along the fourth direction.

6. The roll replacing device according to claim 5, wherein each of the cutting assemblies further comprises a mounting base movably connected to the moving plate along the first direction, and the first cutter and the second cutter are mounted to the mounting base; and
the mounting bases of the two cutting assemblies are both drivingly connected with the adjusting assembly, so as to be driven by the adjusting assembly to approach or away from each other along the first direction.

7. The roll replacing device according to claim 1, wherein the first fixing mechanism has a first fixing position and a second fixing position arranged at intervals along the first direction, and the first fixing position and the second fixing position are used for fixing the working material strip and the spare material strip.

8. The roll replacing device according to claim 7, wherein the first fixing mechanism comprises a clamping driving member mounted on the sliding bracket and two clamping blocks drivingly connected with the clamping driving member; the first fixing position and the second fixing position are formed between the two clamping blocks, and the clamping driving member is used to drive the two clamping blocks to clamp or release each other.

9. The roll replacing device according to claim 7, wherein the second fixing mechanism comprises a first fixing assembly, a second fixing assembly, and a third fixing assembly, and the first fixing assembly and the second fixing assembly are located on both sides of the third fixing assembly in the first direction, respectively; during movement of the sliding bracket along the first direction, the first fixing position and the second fixing position can be alternately aligned with the third fixing assembly;
wherein the second fixing position is aligned with the second fixing assembly when the first fixing position is aligned with the third fixing assembly, so that the second fixing assembly fixedly connects the spare material strip passing through the second fixing position;
when the second fixing position is aligned with the third fixing assembly, the first fixing position is aligned with the first fixing assembly such that the first fixing assembly fixedly connects the spare material strip passing through the first fixing assembly.

10. The roll replacing device according to claim 9, wherein the first fixing assembly comprises a first bracket, a first fixed clamping block, and a first movable clamping block; and the first fixed clamping block is fixedly connected to the first bracket, and the first movable clamping block is provided on the first bracket and is configured to be able to approach or move away from the first fixed clamping block.

11. The roll replacing device according to claim 9, wherein the second fixing assembly comprises a second bracket, a second fixed clamping block, and a second movable clamping block; and the second fixed clamping block is fixedly connected to the second bracket, and the second movable clamping block is provided on the second bracket and is configured to be able to approach or move away from the second fixed clamping block.

12. The roll replacing device according to claim 9, wherein the third fixing assembly comprises a third bracket, a gripping driving member, and two gripping blocks; and the gripping driving member is mounted to the third bracket; and the two gripping blocks are connected to the gripping driving member, so as to be driven by the gripping driving member to tightly clamp or release the working material strip between the two gripping blocks.

13. The roll replacing device according to claim 7, wherein the unwinding assembly comprises a first unwinding assembly and a second unwinding assembly, the first unwinding assembly and the second unwinding assembly are provided on both sides of the sliding bracket in the first direction, respectively; the first unwinding assembly is used to unwind and output a material strip that can be used as the working material strip or the spare material strip to the first fixing mechanism; the second unwinding assembly is used to unwind and output a material strip that can be used as the spare material strip or the working material strip to the first fixing mechanism.

14. The roll replacing device according to claim 13, wherein the first fixing position is arranged corresponding to the first unwinding assembly, so that the first fixing position is used to tightly clamp or release the material strip unwound and output from the first unwinding assembly; the second fixing position is arranged corresponding to the second unwinding assembly, so that the second fixing position is used to tightly clamp or release the material strip unwound and output from the second unwinding assembly.

15. The roll replacing device according to claim 1, wherein the strip connection mechanism comprises a tape sticking assembly, and the tape sticking assembly comprises a tape sticking driving member and two tape sticking suction cups drivingly connected to the tape sticking driving member, and at least one of the two tape sticking suction cups is used to suck up adhesive tapes, and the tape sticking driving member is used to drive the two tape sticking suction cups to be in a closed state to stick the adhesive tapes on the tape sticking suction cups to the working material strip and the spare material strip aligned at the strip connection station.

16. The roll replacing device according to claim 15, wherein the strip connection mechanism further comprises a translation driving member and a driving block; the translation driving member is drivingly connected to the driving block, and the tape sticking driving member is mounted to the driving block; and the translation driving member is used to drive the driving block to move between a tape spare position where the tape sticking suction cups suck up the adhesive tapes and a tape sticking position where the tape sticking suction cups stick the adhesive tapes to the working material strip and the spare material strip.

17. The roll replacing device according to claim 16, wherein the strip connection mechanism further comprises a tape spare plate arranged on the tape spare position, and at least one side surface of the tape spare plate is used for sticking the adhesive tapes; and when the driving block moves to the tape spare position, the tape sticking driving member drives the two tape sticking suction cups to be in the closed state, so that the tape sticking suction cups suck up the adhesive tapes on the tape spare plate.

18. The roll replacing device according to claim 15, wherein the tape sticking driving member is used to drive the two tape sticking suction cups to rotate in opposite directions to each other to the closed state and a flat state.

19. A tab welding apparatus, wherein comprising the roll replacing device according to claim 1.

20. The roll replacing device according to claim 1, wherein the unwinding mechanism further comprises a base and a switching driving member; the sliding bracket is movably connected to the base along the first direction, the switching driving member is mounted on the base and is connected to the sliding bracket by transmission, so as to drive the sliding bracket to move along the first direction relative to the base.

* * * * *